J. E. & F. KORDICK.
HAY CARRIER.
APPLICATION FILED JAN. 11, 1916.
1,196,248.
Patented Aug. 29, 1916.
2 SHEETS—SHEET 2.
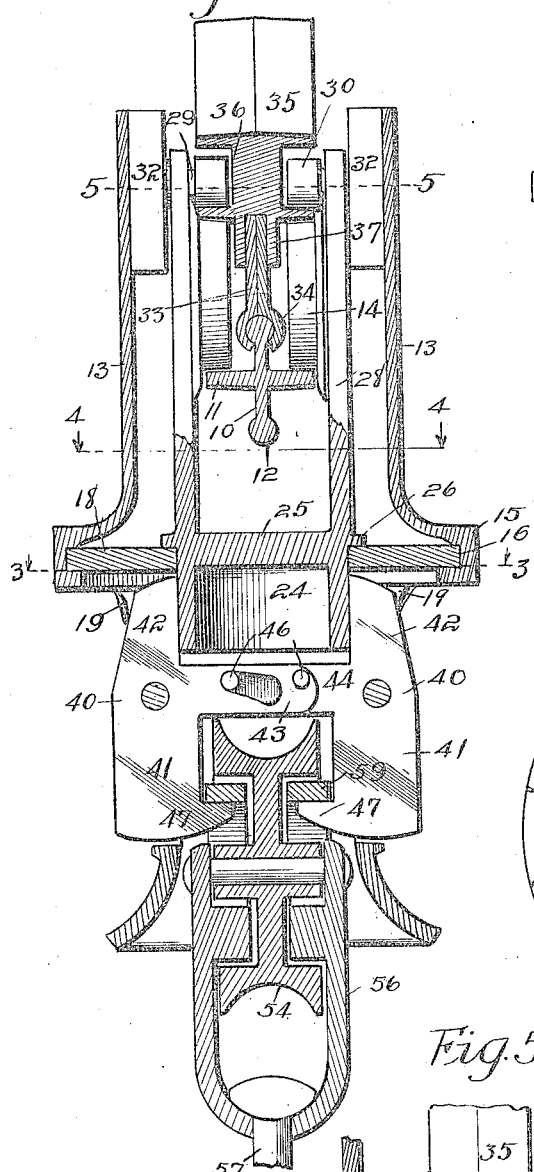
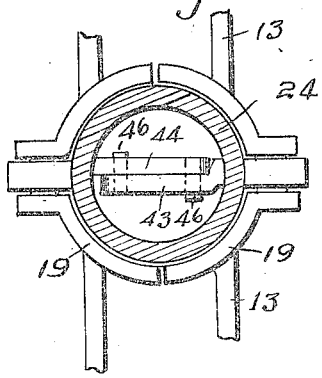
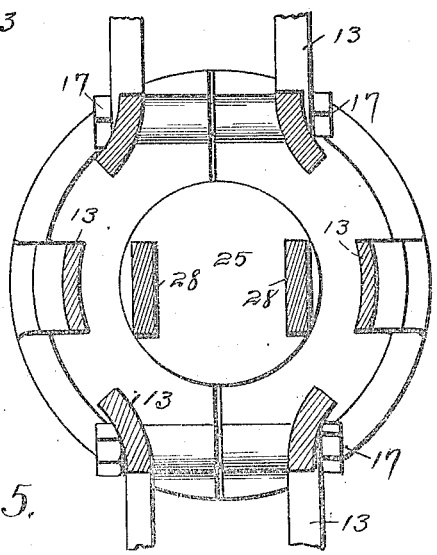
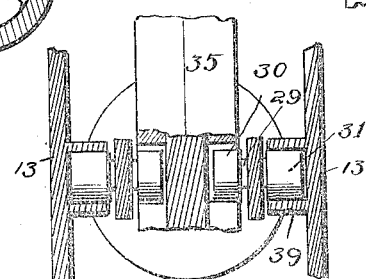
Witnesses
A. G. Hague
Will Freeman
Inventors
John E. Kordick
Frank Kordick
by Orwig Bair Attys

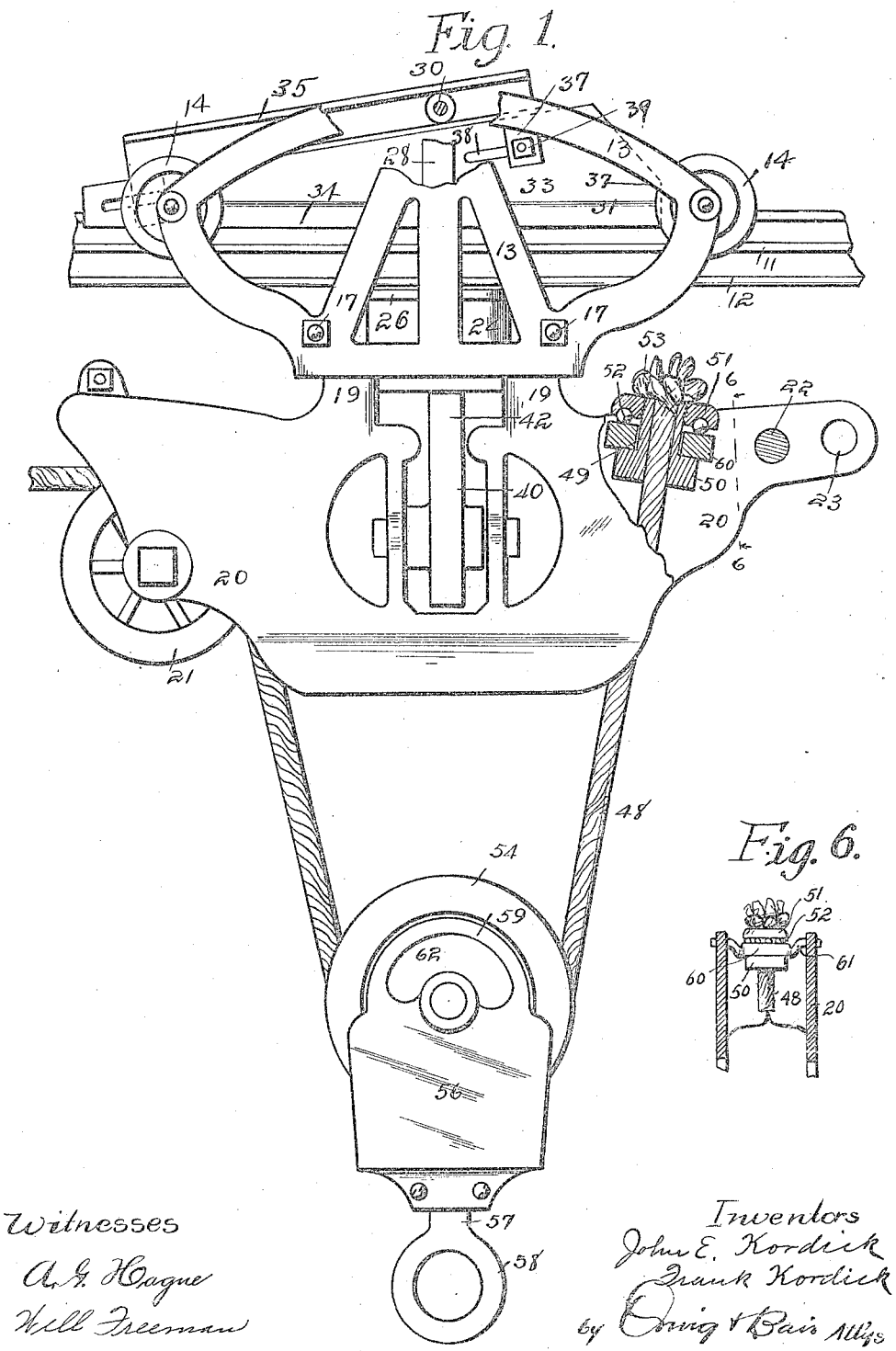

UNITED STATES PATENT OFFICE.

JOHN E. KORDICK AND FRANK KORDICK, OF BRIDGEWATER, IOWA.

HAY-CARRIER.

1,196,248.   Specification of Letters Patent.   Patented Aug. 29, 1916.

Application filed January 11, 1916. Serial No. 71,437.

*To all whom it may concern:*

Be it known that we, JOHN E. KORDICK and FRANK KORDICK, citizens of the United States, and residents of Bridgewater, in the county of Adair and State of Iowa, have invented a certain new and useful Hay-Carrier, of which the following is a specification.

The object of our invention is to provide a hay carrier of simple, durable and inexpensive construction.

A further object is to provide such a carrier in combination with an attachment for a track, so constructed and arranged that when the carrier and attachment are in their coacting positions the pulley engaging member is held in inoperative position.

A further object is to provide such a hay carrier having a carriage member adapted to travel on the track, and new and novel means for engaging the pulley frame and locking the pulley frame to the carriage.

Still a further object is to provide such a carrier in combination with a track attachment, whereby said means may be released and the carrier permitted to travel to a certain position on the track, the parts being so arranged that the carrier may be moved away from said attachment by the operation of the hay rope.

A further object is to provide a hay carrier provided with means for securing it to one end of a rope for permitting the rotation of the rope, and also for permitting the tilting of said rope.

Our invention consists in the construction, arrangement and combination of the various parts of the device, whereby the objects contemplated are attained, as hereinafter more fully set forth, pointed out in our claims, and illustrated in the accompanying drawings, in which:

Figure 1 shows a side elevation of a hay carrier embodying our invention. Fig. 2 shows a transverse, central sectional view through the same. Fig. 3 shows a horizontal sectional view, taken on the line 3—3 of Fig. 2. Fig. 4 shows a horizontal sectional view, taken on the line 4—4 of Fig. 2. Fig. 5 shows a horizontal sectional view, taken on the line 5—5 of Fig. 2. Fig. 6 shows a vertical sectional view, taken on the line 6—6 of Fig. 1.

It is well known that in the art of hay carriers for raising and transferring hay from a wagon or the like to a hay loft or to the interior of a barn, it is common to have some means on the carrier for engaging and holding the pulley on the hay rope to which the fork is secured.

Our device relates to that class of hay carriers having pawls adapted to engage the pulley frame, and having vertically slidable means adapted in one position to lock the pawls in position where they will not engage the pulley, and adapted in another position to lock the pawls in position for engaging and holding the pulley. Our invention involves a device to be placed on the track and adapted to raise said movable member to position out of engagement with the pawls when the track is in one position on the track.

In the accompanying drawings we have used the reference numeral 10 to indicate generally a hay track of the type having a vertical member and having central opposite laterally extending flanges 11. The upper and lower edges of the track 10 are preferably formed with a ball 12.

Our improved hay carrier comprises a frame having the side members 13 spaced from each other. Each side member 13 carries at its opposite ends a flanged wheel 14 adapted to travel on one of the flanges 11, as clearly illustrated in Figs. 1 and 2. Formed at the central lower portion of the side members 13 is a swivel or turntable member 15, having an internal annular groove 16. The side members 13 are secured together by means of bolts 17. Received in the groove 16 is an annular disk or turntable member 18, to which is secured a downwardly extending frame 19. The lower part of the frame 19 comprises spaced side members 20. Between the members 20 at one end thereof, is rotatably mounted a pulley 21. The members 20 at the other end thereof are secured together by a bolt 22, and one of said members 20 adjacent to the bolt 22 is provided with an opening 23 for the small return rope.

The turntable or disk 18 is provided with a central opening in which is mounted a vertically slidable cylinder 24, having its upper end closed by the member 25 and having at its upper end an annular outwardly extending flange 26, which in the lower position of said cylinder rests upon the member 18.

Extending upwardly from the cylinder 24 on opposite sides thereof, are arms or frame members 28. Mounted on the upper ends of the members 28 are short shafts 29. Mounted on the inner ends of the shafts 29 are rollers 30, and mounted on the outer ends of said shafts are rollers 31. The rollers 31 travel vertically in guide channels 32 on the upper parts of the frame members 13, as shown in Fig. 5.

Detachably mounted upon the track 10, preferably over the place from which the hay is to be raised, is an attachment which will now be described. A pair of clamping members 33 are placed adjacent to each other, and are formed at their lower ends with portions 34 adapted to engage the upper ball 12 of the track. The upper edges of the members 33 are inclined upwardly from one end to the other, as clearly shown in Fig. 1. Mounted above the inclined upper edges of the members 33 is a member 35 having opposite outwardly opening channels 36 inclined from their lower ends upwardly, as shown in Fig. 1. The member 35 is provided near each end with a pair of downwardly extending spaced lugs 37 designed to receive between them the members 33, as shown in Figs. 1 and 2. The members 33 are provided with inclined slots 38. Bolts 39 are extended through the lugs 37 and the slots 38 in the members 33, for firmly securing the members 35 on the members 33. The slots 38 are provided for permitting suitable adjustment of the member 35, in order to fit various kinds of tracks.

The parts heretofore described are so arranged that when the carriage is moved toward our improved attachment from the direction opposite the lower end thereof with the cylinder 24 in its lowered position, the rollers 30 will enter the channels 36 and move upwardly, carrying with them the frame members 28 and the cylinder 24.

Pivoted in the spaced members 20 on opposite sides of the carriage, are opposite pawls 40 having downwardly extending portions 41 and upwardly extending portions 42. The pawls 40 have opposite their pivot points inwardly extending arms 43 and 44 respectively, so arranged as to overlap each other, as shown in Fig. 2. The members 43 and 44 are provided with slots 45. The member 44 is provided with a pin 46, which travels in the slot 45 of the member 43, and the member 43 is provided with a pin 46 which travels in the slot in the member 44. The pin and slot connection is provided simply in order that the pawls may be certain to operate simultaneously. On the lower portions 41 of the pawls 40, are inwardly extending lugs or catch members 47, the operation of which will be hereinafter more fully described.

For securing one end of the rope 48 to our improved carrier in such a way as to permit the rope to rotate freely, thereby avoiding kinking the rope, we provide the following means: A hollow cylinder 49 is provided at its lower end with an annular outwardly extending flange 50. Rotatably mounted on the cylinder above the flange 50 is a collar 60 having oppositely extending pins 61 mounted in the frame members 20. Formed in the upper surface of the collar 60 is a ball race. Secured on to the upper end of the cylinder 49 is a collar or member 51 formed in the lower surface of which is a coacting ball race member. Mounted in the ball race formed by the members just described, are ordinary steel balls 52. The rope 48 is extended through the cylinder 49 and a knot 53 is tied in the upper end thereof. It will be seen that the collar 51 and the cylinder 49 may readily rotate on the collar 60 to permit free rotation of the rope 48, whereby any kinking or twisting of the rope may be prevented, and also that the collar 60 may tilt to various positions so that the rope 48 may impose a straight pull on the rope holding device just described. We provide a pulley 54 mounted in the frame 56, in the lower end of which is swiveled a shank 57 on which is formed a ring 58 to which the fork may be secured. The frame 56 is provided with upwardly extending members 59 on opposite sides of the pulley 54. The members 59 are curved from their central portions downwardly in the arcs of circles having their centers in the line of the central axis of the pulley 54, leaving an opening space 62 adapted to receive the members 47 of the pawls 40.

In the practical use of our improved hay carrier the carrier is mounted on the track and the rope 48 is secured to the rope holding device hereinbefore described, and is then extended around the pulley 54 and over the pulley 21 and connected with any suitable source of power.

Assuming that the carrier is located on the track spaced away from the attachment and that the pulley and parts stand in the positions shown in Fig. 2, (except, of course, that the rollers 30 are not received in the channels 36) then if it is desired to use the device the operation is as follows: The return rope is used to draw the carriage along the track until the rollers 30 enter the channels 36 and travel upwardly therein. As the rollers 30 travel upwardly in the channels 36 the cylinder 24 is drawn upwardly until the lower end thereof clears the upper ends 42 of the pawls 40, whereupon the weight of the block, comprising the pulley 54 and the mounting therefor, will cause the lower ends of the pawls 40 to spring outwardly. A load of hay is taken onto the fork and draft is applied to the rope 48 for pulling the pulley 54 upwardly until it strikes the arms 43 and 44 of the pawls, forcing them upwardly and swinging the lower ends of the pawls inwardly toward each other until the portions 47 thereof stand beneath the frame members 59. It will, of course, be understood that in the installation of a device of this kind the rope 48 is so arranged that it tends to pull the carriage away from the channels 36 toward the place where the load is to be discharged. It thus follows that immediately when draft is imposed on the rope 48 to raise the fork with the load of hay thereon, there will be a pull imposed on the carriage tending to draw it along the track away from the channels 36. The carriage is held against movement along the track by the fact that the ends 42 of the pawls 40 stand beneath the lower end of the cylinder 24, thereby preventing the lowering of the cylinder 24, the arms 28 and the rollers 30. While the parts are in the position just mentioned, the carriage cannot move along the track for the reason that the rollers 30 would have to move in a horizontal line until the cylinder 24 is released. The rollers 30, therefore, engaging the upper flanges of the channels 36 prevent movement of the carriage along the track. It is clear that there is at the same time a downward pressure on the rollers 30 and the cylinder 24, so that when the pulley strikes the arms 43 and 44 and the ends 42 are moved outwardly, the cylinder 24 will immediately drop downwardly between the ends 42. When the cylinder 24 reaches its lower position the pawls will be locked in position for holding the pulley and the carriage will be permitted to move along the track.

One of the important advantages of the construction herein shown arises from the fact that the lower portion of the frame which carries the pawls 40 is rotatably mounted with relation to the upper frame so that the pulley will be properly engaged regardless of the position which it may be in when drawn upwardly.

It will be understood that when the carriage has been drawn along the track to the proper place, the ordinary trip rope on the fork may be used to release the hay. In this connection attention is called to the fact that on account of the pin and slot connection of the members 43 and 44, the pawls 40 are always operated simultaneously.

Attention is also called to the rope holding device whereby the rope may rotate freely to avoid the formation of kinks or knots, and it also tilts slightly so that there may be a straight pull from the pulley 54 to the cylinder 49.

Changes may be made in the construction and arrangement of the parts of our improved hay carrier and it is our intention to cover by our present application any such modified forms of construction which may be included within the reasonable scope of our claims.

We claim as our invention:

1. In a device of the class described, a carriage having a reciprocating member, and a pair of spaced rollers thereon, an attachment designed to be placed on a track, having a member with a pair of oppositely opening channels inclined from their lower ends upwardly, adapted to receive said rollers for raising said reciprocating member, said attachment including a pair of clamping members adapted to be secured to a track, the member having said channels formed therein having pairs of opposite downwardly extending lugs for receiving the upper portions of said clamping members, and means for securing said lugs to said clamping members.

2. In a device of the class described, a carriage having a reciprocating member with a pair of spaced rollers thereon, an attachment designed to be placed on a track, having a pair of oppositely opening channels inclined from their lower ends upwardly, adapted to receive said rollers for raising said reciprocating member, said attachment including a pair of clamping members adapted to be secured to a track, said channels having pairs of opposite downwardly extending lugs for receiving the upper portions of said clamping members, said clamping members having inclined elongated slots, bolts extended through said lugs and said slots, nuts on said bolts whereby said channels may be variably locked on said clamping members.

Des Moines, Iowa, October 9, 1915.

JOHN E. KORDICK.
FRANK KORDICK.

Copies of this patent may be obtained for five cents each, by addressing the "Commissioner of Patents, Washington, D. C."